United States Patent
Buchholz et al.

(10) Patent No.: US 11,365,698 B2
(45) Date of Patent: Jun. 21, 2022

(54) METHOD FOR THE MODEL-BASED CONTROL AND REGULATION OF AN INTERNAL COMBUSTION ENGINE

(71) Applicant: MTU FRIEDRICHSHAFEN GMBH, Friedrichshafen (DE)

(72) Inventors: Michael Buchholz, Ulm (DE); Knut Graichen, Ulm (DE); Karsten Harder, Langenau (DE); Jens Niemeyer, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 16/652,659

(22) PCT Filed: Jul. 20, 2018

(86) PCT No.: PCT/EP2018/069847
§ 371 (c)(1),
(2) Date: Mar. 31, 2020

(87) PCT Pub. No.: WO2019/076502
PCT Pub. Date: Apr. 25, 2019

(65) Prior Publication Data
US 2020/0240344 A1    Jul. 30, 2020

(30) Foreign Application Priority Data
Oct. 16, 2017 (DE) .................... 10 2017 009 583.3

(51) Int. Cl.
*B60T 7/12* (2006.01)
*F02D 41/14* (2006.01)
(Continued)

(52) U.S. Cl.
CPC ......... *F02D 41/1406* (2013.01); *F02D 21/08* (2013.01); *F02D 41/0072* (2013.01);
(Continued)

(58) Field of Classification Search
CPC ..... F02D 2041/1412; F02D 2041/1417; F02D 2041/1433; F02D 21/08; F02D 41/0072; F02D 41/1406
(Continued)

(56) References Cited

U.S. PATENT DOCUMENTS 5,657,735 A * 8/1997 Maki .................... F02D 41/1402
                                                              60/276
5,657,736 A * 8/1997 Maki .................... F02D 41/0085
                                                              123/673

(Continued)

FOREIGN PATENT DOCUMENTS

DE    102006004516 B3    3/2007
DE    102009016509 A1    10/2010
(Continued)

OTHER PUBLICATIONS

Samokhin Sergey et al.: "High-pressure 1-3 recirculated exhaust gas fraction estimation and control in marine diesel engines", 2015 54th IEEE Conference on Dec! Sion and Control (CDC). IEEE, Dec. 15, 2015 (Dec. 15, 2015), pp. 1787-1792, XP032862375.
(Continued)

*Primary Examiner* — John Kwon
(74) *Attorney, Agent, or Firm* — Lucas & Mercanti, LLP; Klaus P. Stoffel (57) ABSTRACT

A method for controlling and regulating an internal combustion engine with exhaust gas recirculation, in which an EGR rate is determined by a Kaiman filter from calculated and measured variables of the gas path and from calculated and measured variables of combustion. A method for the model-based control and regulation of an internal combustion engine includes calculating injection system set values for controlling the injection system actuators as a function of a set torque by a combustion model. Gas path set values for controlling the gas path actuators are calculated as a function
(Continued)

of an EGR rate by a gas path model. A measure of quality is calculated by an optimizer as a function of the injection system and gas path set values. The measure of quality is minimized by the optimizer by changing the injection system and gas path set values within a prediction horizon. The injection system and gas path set values are set by the optimizer as definitive for adjusting the operating point of the engine by using the minimized measure of quality.

9 Claims, 5 Drawing Sheets (51) Int. Cl.
  *F02D 21/08* (2006.01)
  *F02D 41/00* (2006.01)
  *F02D 41/38* (2006.01)
  *F02D 41/40* (2006.01)

(52) U.S. Cl.
  CPC ........ *F02D 41/3836* (2013.01); *F02D 41/401* (2013.01); *F02D 2041/1412* (2013.01); *F02D 2041/1417* (2013.01); *F02D 2041/1433* (2013.01)

(58) Field of Classification Search
  USPC .............................................. 123/41.01–41.3
  See application file for complete search history.

(56) References Cited

U.S. PATENT DOCUMENTS

| | | | | |
|---|---|---|---|---|
| 5,755,094 | A * | 5/1998 | Maki | F02D 41/1402 60/276 |
| 5,758,308 | A * | 5/1998 | Maki | F02D 41/008 123/687 |
| 5,758,490 | A * | 6/1998 | Maki | F02D 41/1473 60/276 |
| 5,806,012 | A * | 9/1998 | Maki | F02D 41/1402 123/480 |
| 5,908,463 | A * | 6/1999 | Akazaki | F02D 41/1473 123/480 |
| 6,173,704 | B1 * | 1/2001 | Komoriya | F02D 41/0235 123/568.21 |
| 8,201,442 | B2 | 6/2012 | Osburn | |
| 9,109,519 | B2 | 8/2015 | Loeffler | |
| 9,228,508 | B2 | 1/2016 | Bleile | |
| 9,267,485 | B2 | 2/2016 | Ravi | |
| 9,863,344 | B2 * | 1/2018 | Deb | F02D 41/0072 |
| 10,132,230 | B2 | 11/2018 | Shutty | |
| 2002/0129799 | A1 * | 9/2002 | Wang | F02M 26/49 73/114.76 |
| 2011/0172897 | A1 | 7/2011 | Tsuzuki | |
| 2014/0012457 | A1 | 1/2014 | Bachner | |
| 2014/0150761 | A1 | 6/2014 | Blumendeller | |
| 2016/0025020 | A1 | 1/2016 | Hodzen | |
| 2016/0138498 | A1 * | 5/2016 | De Luna | F02D 41/0052 60/274 |
| 2016/0312728 | A1 | 10/2016 | Ge | |
| 2018/0187617 | A1 | 7/2018 | Shutty | |
| 2018/0216558 | A1 | 8/2018 | Buchholz | |
| 2019/0264626 | A1 * | 8/2019 | Dods | F02D 41/146 |

FOREIGN PATENT DOCUMENTS

| | | |
|---|---|---|
| DE | 112010003780 T5 | 9/2012 |
| DE | 102011006756 A1 | 8/2013 |
| FR | 2973441 A1 | 10/2012 |
| GB | 2484049 B | 6/2015 |
| JP | 2009520918 A | 5/2009 |
| JP | 2009222007 A | 10/2009 |
| JP | 2011522159 A | 7/2011 |
| JP | 2013519040 A | 5/2013 |
| JP | 2016516147 A | 6/2016 |
| WO | 2017102039 A1 | 6/2017 |

OTHER PUBLICATIONS

Harder Karsten et al.: "Nonlinear MPC with emission control for a real-world off-highway diesel engine", 2017 IEEE International Conference on Advanced Intelligent Mechatronics (AIM), IEEE, Jul. 3, 2017 (Jul. 3, 2017), pp. 1768-1773, XP033144574.

Harder Karsten et al.: "A real-time nonlinear MPC scheme with emission constraints for heavy-duty diesel engines", 2017 American Control Conference (ACC), AACC, May 24, 2017 (May 24, 2017), pp. 240-245, XP033109918.

* cited by examiner

METHOD FOR THE MODEL-BASED CONTROL AND REGULATION OF AN INTERNAL COMBUSTION ENGINE

CROSS-REFERENCE TO RELATED APPLICATIONS

The present application is a 371 of International application PCT/EP2018/069847, filed Jul. 20, 2018, which claims priority of DE 10 2017 009 583.3, filed Oct. 16, 2017, the priority of these applications is hereby claimed and these applications are incorporated herein by reference.

BACKGROUND OF THE INVENTION

The invention relates to a method for the open-loop and closed-loop control of an internal combustion engine with exhaust-gas recirculation, in which method an EGR rate is determined by means of a Kalman filter from calculated and measured variables of the gas path and from calculated and measured variables of the combustion. The invention furthermore relates to a method for the model-based open-loop and closed-loop control of an internal combustion engine, in which method injection system setpoint values for the activation of the injection system control elements are calculated in a manner dependent on a setpoint torque by means of a combustion model, and gas path setpoint values for the activation of the gas path control elements are calculated in a manner dependent on an EGR rate by means of a gas path model.

The behaviour of an internal combustion engine is definitively determined by means of an engine control unit in a manner dependent on a power demand. For this purpose, corresponding characteristic curves and characteristic maps are implemented in the software of the modern engine control unit. By means of these, the control variables of the internal combustion engine, for example the start of injection and a required rail pressure, are calculated from the power demand. These characteristic curves/characteristic maps are populated with data by the manufacturer of the internal combustion engine on a test stand. The large number of such characteristic curves/characteristic maps, and the correlation of the characteristic curves/characteristic maps with one another, however give rise to a high level of outlay in terms of tuning.

One known measure for reducing the nitrogen oxide emissions is exhaust-gas recirculation. Since the exhaust-gas recirculation rate, refer to for short as EGR rate, cannot be directly measured, it must be derived from other measured variables. For example, DE 10 2011 006 756 A1 proposes, for the determination of the EGR rate, a differential pressure measurement in a manner dependent on the gas pressure and the atmospheric pressure. DE 11 2010 003 780 T5 in turn proposes an estimation method in which the present exhaust-gas mass flow through the exhaust-gas recirculation line is estimated on the basis of a pressure difference, the cooler outlet temperature of the EGR cooler, and the inlet manifold pressure. Owing to the harsh conditions for the sensor arrangement and the tolerances of the control element, both known methods have room for improvement with regard to accuracy. The use of differential pressure sensors is expensive. That which has been stated above applies with regard to the outlay in terms of tuning by means of characteristic maps.

In practice, it is sought to reduce the outlay in terms of tuning through the use of mathematical models. For example, DE 10 2006 004 516 B3 discloses a Bayesian network with probability tables for defining an injection quantity, and US 2011/0172897 A1 describes a method for adapting the start of injection and the injection quantity by means of combustion models using neural networks. It is critical here that only trained data is mapped, which data must firstly be learned during a test stand run.

US 2016/0025020 A1 discloses a model-based closed-loop control method for the gas path of an internal combustion engine. The gas path comprises both the air side and the exhaust-gas side together with an exhaust-gas recirculation arrangement. In a first step of the method, the present operating situation of the internal combustion engine is ascertained from the measured variables of the gas path, for example the charge-air temperature or the NOx concentration. In a second step, a quality measure is then calculated within a prediction horizon, likewise from the measured variables, by means of a physical model of the gas path. Then, in turn, in a third step, the activation signals for the control elements of the gas path are defined from the quality measure and the operating situation. The specified method relates exclusively to the gas path and is based on a linearized gas path model. Owing to the linearization, a loss of information is inevitable.

SUMMARY OF THE INVENTION

The invention therefore addresses the problem of developing an improved method for determining the EGR rate, which permits holistic model-based open-loop and closed-loop control of the internal combustion engine.

Said problem is solved by means of the features of claim 1 and claim 4. The refinements are presented in the respective subclaims.

The first solution to the problem consists in that the EGR rate is determined by means of a Kalman filter from calculated and measured variables of the gas path and from calculated and measured variables of the combustion. Here, use is preferably made of an extended Kalman filter, a Sigma-Point Kalman filter or a Spherical Simplex Unscented Kalman filter. The emissions values of the combustion, in particular nitrogen oxide values, are also taken into consideration in the calculation of the EGR rate. Based on the present EGR rate, a future EGR rate is then predicted, which is set as definitive for a combustion model and a gas path model. In the Kalman filter, in addition to the physical variables of the gas path, variables are also calculated, for example the pressure at the outlet valve of the internal combustion engine, which is in turn jointly decisive for the determination of the EGR rate. A comparison of measured and calculated variables is advantageous here. For example, large deviations are unequivocally identified and a substitute function is implemented for continued operation. Furthermore, a comparison of, for example, measured NOx values with model-calculated NOx values is possible.

The second solution to the problem consists in that injection system setpoint values for the activation of the injection system control elements are calculated in a manner dependent on a setpoint torque by means of a combustion model, and gas path setpoint values for the activation of the gas path control elements are calculated in a manner dependent on the EGR rate by means of a gas path model. Furthermore, the method consists in that a quality measure is calculated by an optimizer in a manner dependent on the injection system setpoint values and the gas path setpoint values. By variation of the injection system setpoint values and gas path setpoint values within a prediction horizon, the optimizer minimizes the quality measure and sets the minimized quality measure as being definitive for the setting of the operating point of the internal combustion engine.

As already described above, the EGR rate is determined by means of a corresponding Kalman filter. The emissions values of the combustion, in particular nitrogen oxide values, are also taken into consideration in the calculation of the EGR rate. On the basis of the present EGR rate, a future EGR rate is then predicted, which is set as being definitive for a combustion model and a gas path model. In the Kalman filter, in addition to the physical variables of the gas path, variables are also calculated, for example the pressure at the outlet valve of the internal combustion engine, which is in turn jointly decisive for the determination of the EGR rate. The advantages of the Kalman filter as described above also apply here.

The minimized quality measure is calculated in that, by the optimizer, a first quality measure is calculated at a first point in time and a second quality measure is predicted within the prediction horizon at a second point in time. Following this, a deviation of first and second quality measure is determined. If the deviation is less than a threshold value, then the second quality measure is set by the optimizer as a minimized quality measure. The threshold value consideration is thus a termination criterion because a further minimization would not lead to any more precise an adaptation. Instead of the threshold value consideration, it is also possible for a predefinable number of recalculations to be set as a termination criterion.

Then, on the basis of the minimized quality measure, a rail pressure setpoint value for a subordinate rail pressure closed control loop is indirectly predefined, and a start of injection and an end of injection for the activation of an injector is directly predefined, by the optimizer as injection system setpoint values. Additionally, the gas path setpoint values, for example a lambda setpoint value for a subordinate lambda closed control loop and an EGR setpoint value for a subordinate EGR closed control loop, are then predefined by the optimizer.

Both the combustion model and the gas path model replicate the system behaviour of the internal combustion engine in the form of mathematical equations. These are determined in a one-off manner on the basis of a reference internal combustion engine during a test stand run, the so-called DoE (Design of Experiments) test stand run, or from simulation tests. Since, for example, different emissions targets may be set for one and the same type of internal combustion engine, the outlay in terms of tuning is significantly reduced. A distinction between steady-state and transient operation, for example in the case of an onset of load in generator operation, is no longer necessary. Furthermore, the setpoint torque is set in a precise manner, while adhering to the emissions limit values. The models are individually tunable, wherein the models collectively replicate the internal combustion engine. The characteristic curves and characteristic maps that have hitherto been required can thus be omitted.

BRIEF DESCRIPTION OF THE DRAWING

A preferred exemplary embodiment as illustrated in the figures, in which.

DETAILED DESCRIPTION OF THE INVENTION

Figure 1:
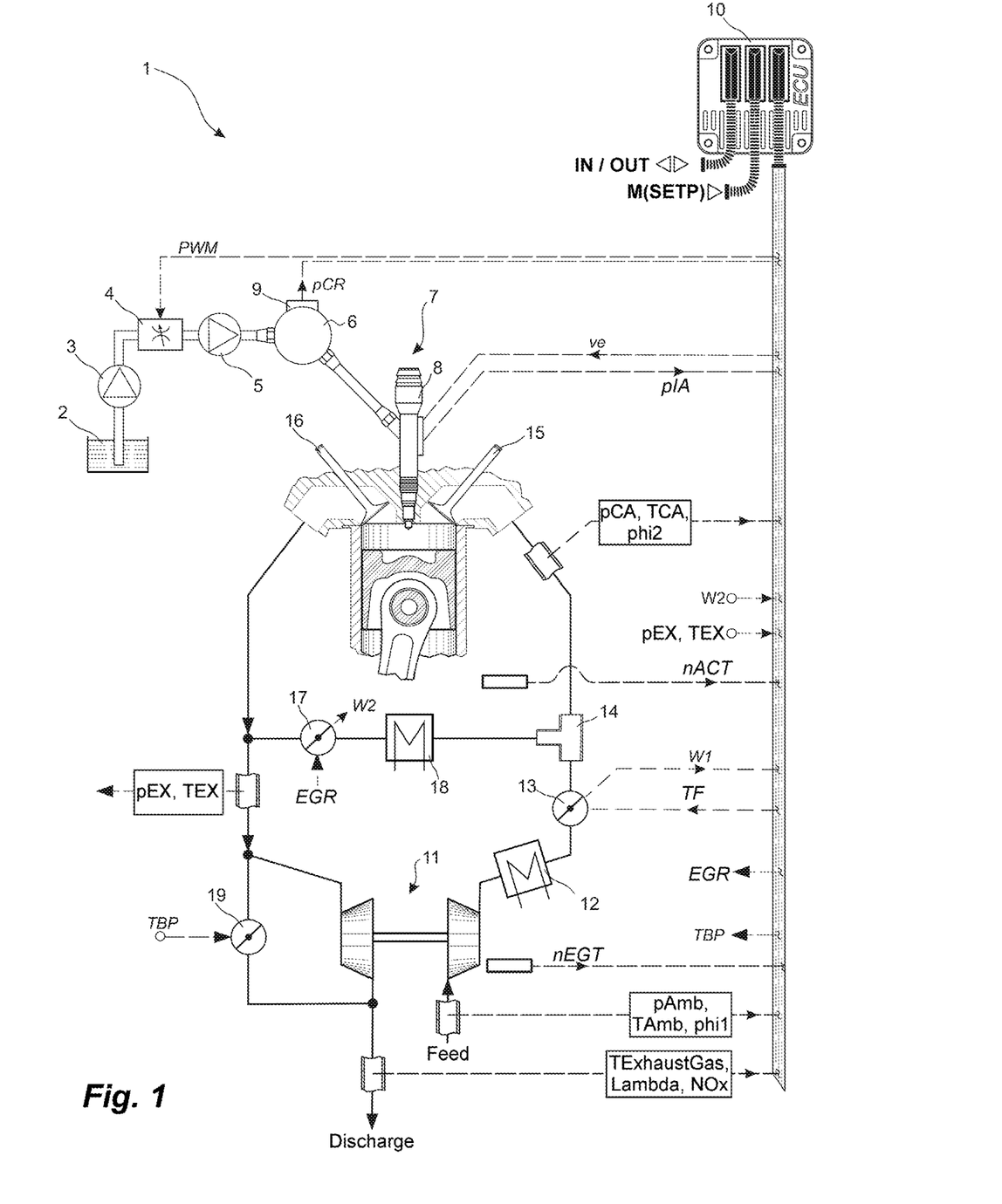
FIG. 1 shows a system schematic.

FIG. 1 shows a system schematic of an electronically controlled internal combustion engine 1 with a common rail system. The common rail system comprises the following mechanical components: a low-pressure pump 3 for conveying fuel out of a fuel tank 2, a variable intake throttle 4 for influencing the fuel volume flow passing through, a high-pressure pump 5 for conveying the fuel at elevated pressure, a rail 6 for storing the fuel, and injectors 7 for injecting the fuel into the combustion chambers of the internal combustion engine 1. The common rail system may optionally also be designed with individual accumulators, wherein an individual accumulator 8 is then for example integrated as an additional buffer volume in the injector 7. The further functionality of the common rail system is assumed to be known.

The illustrated gas path comprises both the air feed system and the exhaust-gas discharge system. Arranged in the air feed system are the compressor of an exhaust-gas turbocharger 11, a charge-air cooler 12, a throttle flap 13, an opening-in point 14 for the merging of the charge air with the recirculated exhaust gas, and the inlet valve 15. Arranged in the exhaust-gas discharge system are an outlet valve 16, the turbine of the exhaust-gas turbocharger 11 and a turbine bypass valve 19. An exhaust-gas recirculation path branches off from the exhaust-gas discharge system, in which exhaust-gas recirculation path an EGR control element 17, for the setting of the EGR rate, and the EGR cooler 18 are arranged.

The operation of the internal combustion engine 1 is determined by an electronic control unit 10 (ECU). The electronic control unit 10 comprises the conventional constituents of a microcomputer system, for example a microprocessor, I/O modules, buffer and memory modules (EEPROM, RAM). The operating data relevant for the operation of the internal combustion engine 1 is implemented in the memory modules. By means of said operating data, the electronic control unit 10 calculates the output variables from the input variables. The definitive input variable is the power demand predefined by the operator, for example a setpoint torque M(SETP) or a rotational speed demand or the control variable of a rotational speed closed-loop controller. The input variables of the control unit which relate to the common rail system are the rail pressure pCR, which is measured by means of a rail pressure sensor 9, and optionally the individual accumulator pressure pIA. The input variables of the electronic control unit 10 which relate to the air path are the ambient air pressure pAmb, the ambient air temperature TAmb, a humidity phi1 of the ambient air, the rotational speed nEGT of the exhaust-gas turbocharger 11, an opening angle W1 of the throttle flap 13, the engine rotational speed nACT, the charge-air pressure pCA, the charge-air temperature TCA and the humidity phi2 of the charge air. The input variables of the electronic control unit 10 which relate to the exhaust-gas path are an opening angle W2 of the EGR control element 17, the exhaust-gas pressure pEX and the exhaust-gas temperature TEX upstream of the turbine of the exhaust-gas turbocharger 11, and the exhaust-gas temperature TExhaustGas, the air-fuel ratio Lambda, and the NOx actual value downstream of the turbine of the exhaust-gas turbocharger 11. The further input variables (not illustrated) of the electronic control unit 10 are summarized by the reference designation IN, for example the coolant temperatures.

In FIG. 1, the following are illustrated as output variables of the electronic control unit 10: a signal PWM for the activation of the intake throttle 4, a signal ve for the activation of the injector 7 (start of injection/end of injection), a control signal TF for the activation of the throttle flap 13, a control signal EGR for the activation of the EGR control element 17, a control signal TBP for the activation of the turbine bypass valve 19, and an output variable OUT. The output variable OUT is representative of the further control signals for the open-loop and closed-loop control of the internal combustion engine 1, for example of a control signal for the activation of a second exhaust-gas turbocharger in the case of a multistage supercharging arrangement.

Figure 2:
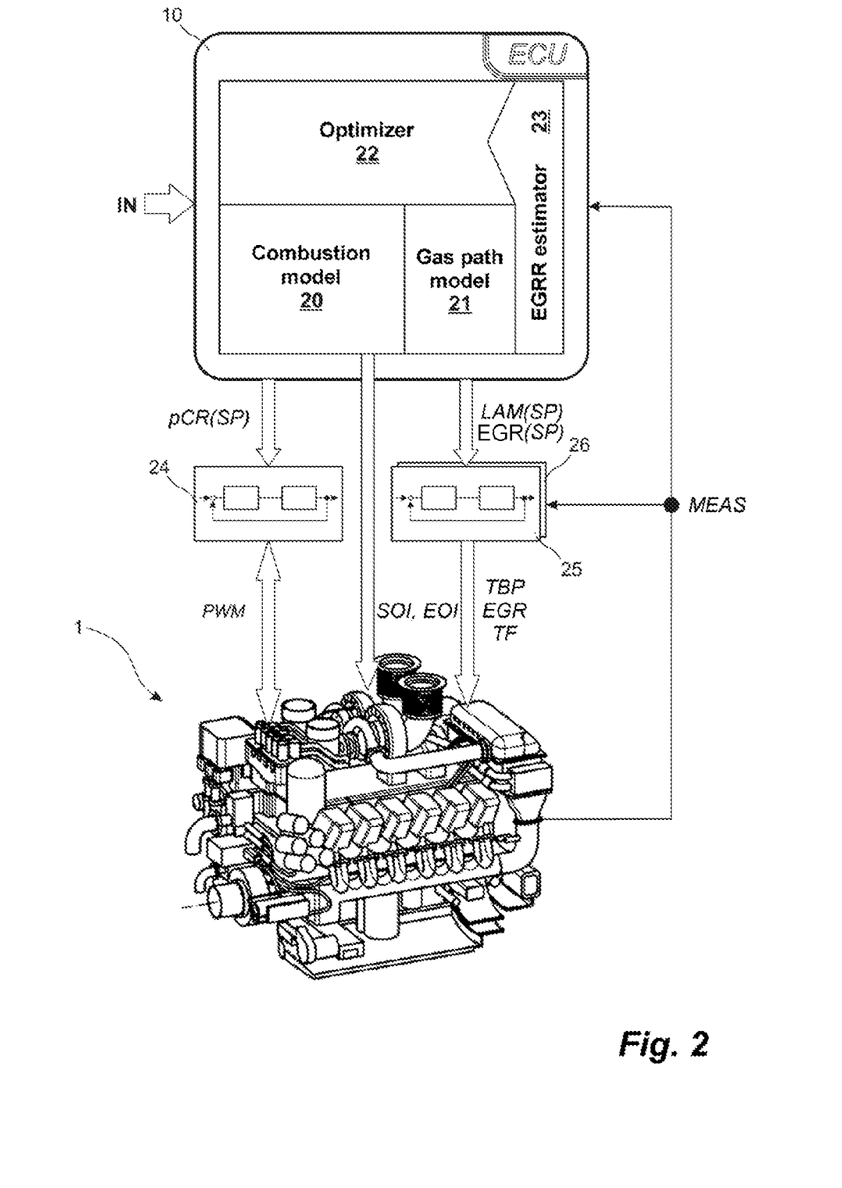
FIG. 2 shows a model-based system schematic.

FIG. 2 shows a model-based system schematic. Here, the reference designation IN denotes the setpoint torque and a selectable emissions class (IMO, Tier4f). In this illustration, a combustion model 20, a gas path model 21, and optimizer 22 and an estimated 23 for the EGR rate EGRR are implemented within the electronic control unit 10. Both the combustion model 20 and the gas path model 21 replicate the system behaviour of the internal combustion engine in the form of mathematical equations. The combustion model 20 replicates, in steady-state form, the processes during the combustion. By contrast to this, the gas path model 21 replicates the dynamic behaviour of the air-conducting arrangement and of the exhaust-gas-conducting arrangement. The combustion model 20 comprises individual models for the generation of NOx and soot, for the exhaust-gas temperature, for the exhaust-gas mass flow, for the peak pressure, and for the torque. These individual models are in turn dependent on the boundary conditions in the cylinder, the parameters of the injection, and the EGR rate. The individual models are stored as functions f1, f2, f3 etc., at least of the start of injection SOI, of the rail pressure pCR and of the EGR rate EGRR; for example in the following general form:

NOx setpoint value=f1(SOI,pCR,EGRR ... ),

Soot=f2(SOI,pCR,EGRR ... ).

The function f1 describes the known relationship of nitrogen oxide emissions, the humidity phi2 of the charge air, the charge-air temperature, the start of injection SOI and the rail pressure pCR. The combustion model 20 is determined in the case of a reference internal combustion engine in a test stand run, the so-called DoE (Design of Experiments) test stand run. In the DoE test stand run, operating parameters and control variables are systematically varied with the aim of replicating the overall behaviour of the internal combustion engine in a manner dependent on engine variables and environmental boundary conditions.

The optimizer 22 evaluates the combustion model 20, specifically with regard to the setpoint torque M(SETP), the emissions limit values, the environmental boundary conditions, for example the humidity phi2 of the charge air, and the operating situation of the internal combustion engine. The operating situation is defined by the engine rotational speed nACT, the charge-air temperature TCA, the charge-air pressure pCA, the EGR rate etc. The function of the optimizer 22 now consists in evaluating the injection system setpoint value for the activation of the injection system control elements and the gas path setpoint values for the activation of the gas path control elements. Here, the optimizer 22 selects the solution with which a quality measure J is minimized. The quality measure J is calculated as an integral of the quadratic setpoint-actual deviations within the prediction horizon; for example in the form:

$$J=\int[w1(NOx(SETP)-NOx(ACT)]^2+[w2(M(SETP)-M(ACT)]^2+[w3(\ldots)]+ \qquad (1)$$

In this, w1, w2 and w3 denote a corresponding weighting factor.

Figure 4:
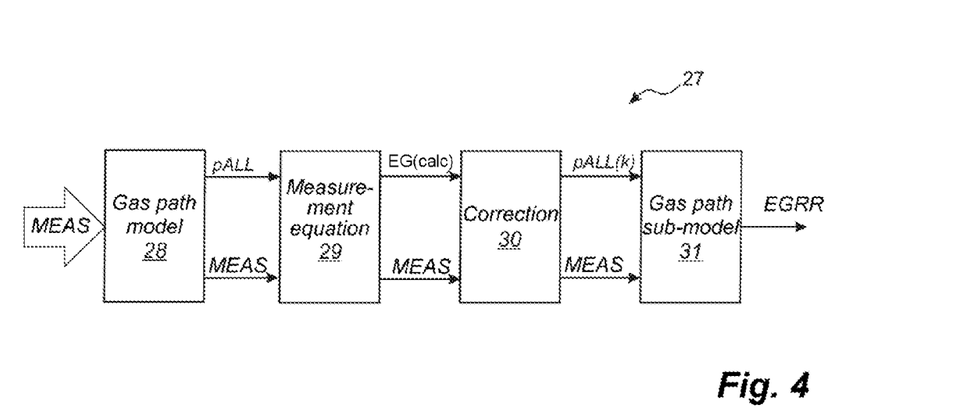
FIG. 4 shows a Kalman filter as a block diagram.
Figure 5A:
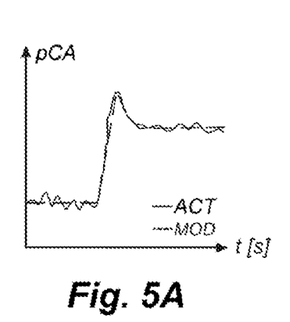
FIG. 5 shows a multi-variable diagram.
Figure 5B:
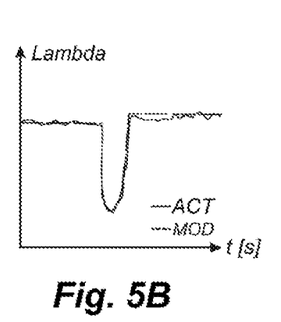
Figure 5C:
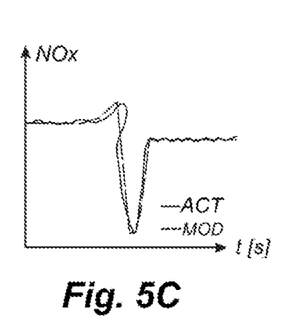
Figure 5D:
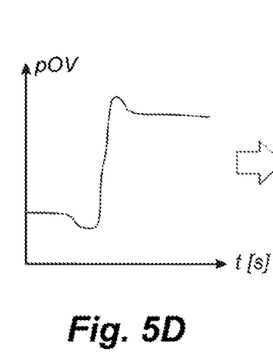
Figure 5E:
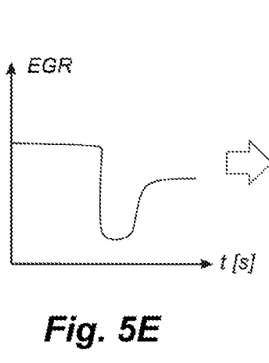
Figure 5F:
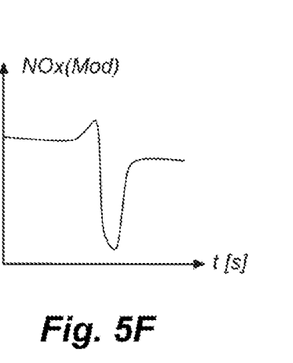

The quality measure J is minimized in that, by the optimizer 22, a first quality measure J1 is calculated at a first point in time, and the injection system setpoint values and the gas path setpoint values are subsequently varied. A second quality measure is then predicted within the prediction horizon on the basis of the new setpoint values and the measured variables MEAS. The returned measured variables MEAS are to be understood to mean both directly measured physical variables and secondary variables calculated from these. Accordingly, the EGR rate EGRR is calculated from the measured variables MEAS by means of the estimator 23. The estimator 23 comprises a Kalman filter, which is illustrated in FIG. 4 and which will be described in conjunction therewith. From the deviation of the two quality measures in relation to one another, the optimizer 22 then specifies a minimum quality measure and sets this as being definitive for the internal combustion engine. For the example illustrated in FIG. 2, these are, for the injection system, the setpoint rail pressure pCR(SP), the start of injection SOI and the end of injection EOI. The setpoint rail pressure pCR(SP) is the reference variable for the subordinate rail pressure closed-loop control circuit 24. The control variable of the rail pressure closed-loop control circuit 24 corresponds to the PWM signal for application to the intake throttle. Direct application to the injector (FIG. 1: 7) is performed upon the start of injection SOI and the end of injection EOI. For the gas path, the optimizer 22 indirectly determines the gas path setpoint values. In the example illustrated, these are a lambda setpoint value LAM(SP) and an EGR setpoint value EGR(SP) for specification for the subordinate lambda closed-loop control circuit 25 and the subordinate EGR closed-loop control circuit 26. The control variables of the two closed-loop control circuits 25 and 26 and the signal TBP for the activation of the turbine bypass, the signal EGR for the activation of the EGR control element and the signal TF for the activation of the throttle flap.

Figures 3A, 3B:
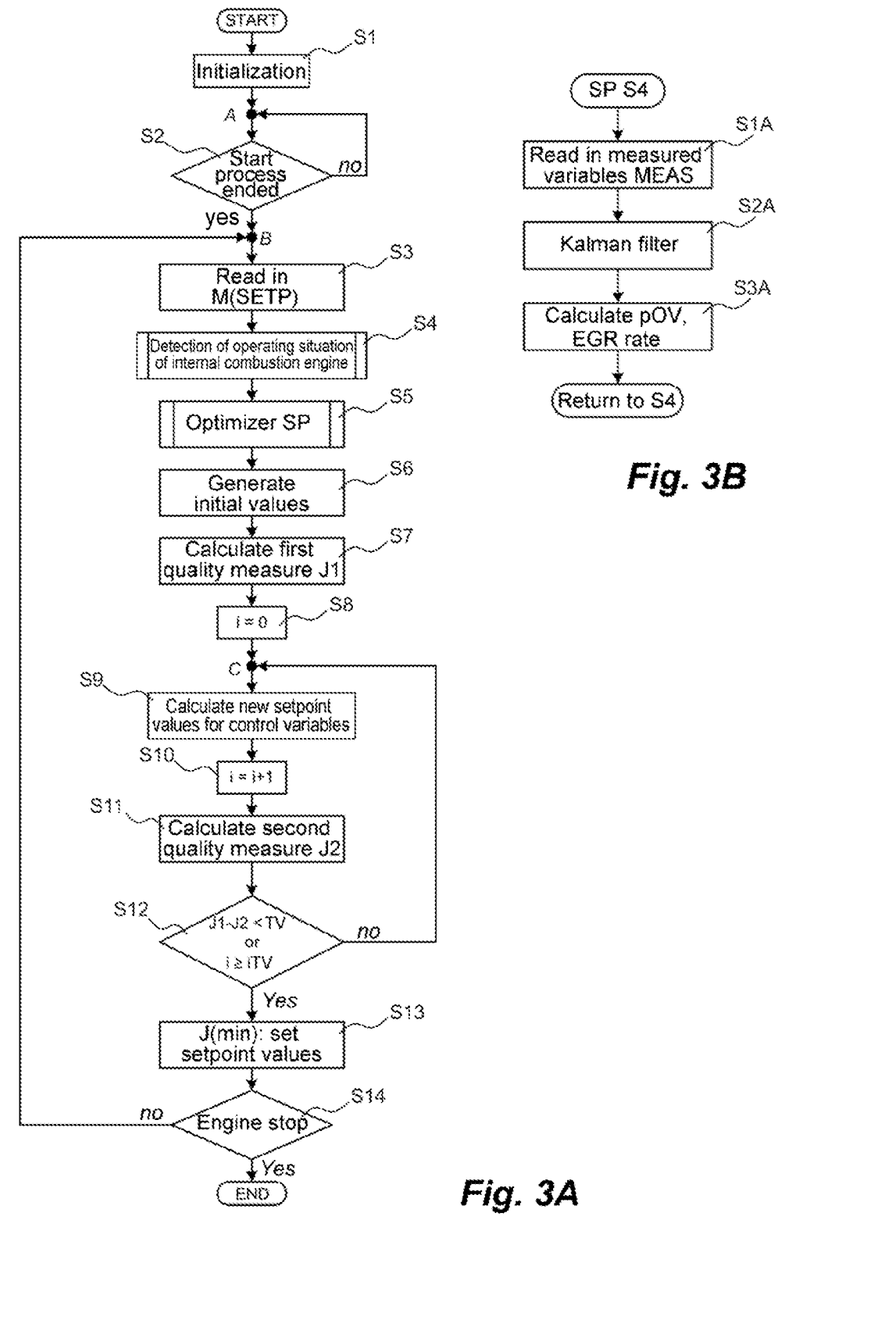
FIG. 3 shows a program flow chart with a sub-programme.

FIG. 3 illustrates the method in a program flow chart as a main program (FIG. 3A) with a sub-programme (FIG. 3B). After the initialization in S1, it is checked in S2 whether the start process has ended. If said start process is still taking place, interrogation result S2: no, a branch is followed back to the point A. If the starting process has ended, then, in S3, the setpoint torque M(SETP) that can be predefined by the operator is read in. Following this, in S4, the operating situation of the internal combustion engine is detected. For this purpose, a branch is followed into the sub-programme of FIG. 3B. In this, in S1A, the measured variables MEAS are read in. In S2A, a pressure pOV at the outlet valve of the internal combustion engine, and, as outlet variable, the EGR rate EGRR, are calculated from the measured variables MEAS by means of a Kalman filter. The calculation will be discussed in conjunction with FIG. 4. A branch is subsequently followed back to the main program at S4.

At S5, the optimizer sub-programme is called up, and the starting value for the combustion model and the gas path model, for example the start of injection SOI, are generated at S6. A first quality measure J1 is calculated on the basis of the equation (1) at S7, and an indexed variable i is set to zero at S8. Subsequently, at S9, the starting values are changed and are calculated as new setpoint values for the control variables. At S10, the indexed variable i is increased by one. On the basis of the new setpoint values, a second quality measure J2 is then predicted within the prediction horizon, for example the next 8 seconds, at S11. At S12, in turn, second quality measure J2 is subtracted from the first quality measure J1 and is compared with a threshold value TV. By means of the calculation of the difference between the two quality measures, the further progression of the quality measure is checked. Alternatively, on the basis of the comparison of the indexed variable i with a threshold value iTV, it is checked how often an optimization has already been performed. The two threshold considerations are thus a termination criterion for a further optimization. If a further optimization is possible, interrogation result S12: no, then a branch is followed back to point C. Otherwise, at S13, the second quality measure J to is set by the optimizer as a minimum quality measure J(min). The injection system setpoint values and the gas path setpoint values for specification for the corresponding control elements then result from the minimum quality measure J(min). Following this, at S14, it is checked whether an engine stoppage has been initiated. If this is not the case, interrogation result S14: no, then a branch is followed back to point B. The program flow chart is otherwise ended.

FIG. 4 illustrates a Kalman filter 27 in highly simplified form in a block diagram. Kalman filters are well known in the art. For the method illustrated, an extended Kalman filter, a Sigma-Point Kalman filter or a Spherical Simplex Unscented Kalman filter is preferred. Here, from measured variables, a model is used to determine corresponding model variables which cannot be directly measured. The input variable of the block diagram of the measured variables MEAS. The output variable corresponds to the EGR rate EGRR. The measured variables MEAS correspond to the measured variables illustrated in FIG. 1, for example the charge-air pressure pCA and the charge-air temperature TCA. The measured variables MEAS are passed through the individual function blocks 28 to 31 such that each function block has access to all measured variables. In a first function block 28 (gas path model), there are stored differential equations by means of which all pressures pALL of the gas path are replicated or calculated, for example the non-measured pressure pOV at the outlet valve. By means of a second function block 29 (measurement equation), model values of the emissions variables EG(ber) are calculated, for example the air-fuel ratio lambda and the nitrogen oxide emission NOx. In a third function block 30 (correction), a stochastic comparison is performed between model and measurement of the pressures, output variable pALL(k). In a fourth function block 31 (gas path sub-model), the EGR rate EGRR is then determined on the basis of the corrected pressures.

FIG. 5 illustrates a multi-variable diagram which correlates with FIG. 4. Here, the following are shown versus the time: FIG. 5A shows the charge-air pressure pCA, FIG. 5B shows the air-fuel ratio lambda, and FIG. 5C shows the nitrogen oxide emissions NOx. In FIGS. 5A to 5C, the solid line denotes the measured actual value, and the dashed line denotes the model-based course. FIG. 5D shows the course of the calculated pressure pOV at the outlet valve. Said pressure is calculated from the measured variables MEAS by means of the first function block 28 (FIG. 4). Then, by means of the Kalman filter, the EGR rate EGRR is determined on the basis of the measured variables MEAS (FIG. 5E). The EGR rate EGRR in turn is a parameter of the combustion model, for example of the model-based nitrogen oxide emission NOx (FIG. 5F).

FIG. 6 illustrates a time diagram. FIG. 6 comprises FIGS. 6A to 6D. Here, the following are shown in each case versus the time: FIG. 6A shows the course of the nitrogen oxide emission NOx, FIG. 6B shows the start of injection SOI in degrees crank angle before top dead centre (TDC), FIG. 6C shows the course of the lambda setpoint value LAM(SP), and FIG. 6 shows the EGR rate EGRR. The time range prior to t0 corresponds to the past. The prediction horizon, for example 8 s, corresponds to the time range t0 to t0+tp. The designation is is used for a calculation time at which a new setpoint value, for example of the start of injection SOI, is output by the electronic control unit. In the example illustrated, a constant setpoint torque M(SETP) is assumed.

Figure 6A:
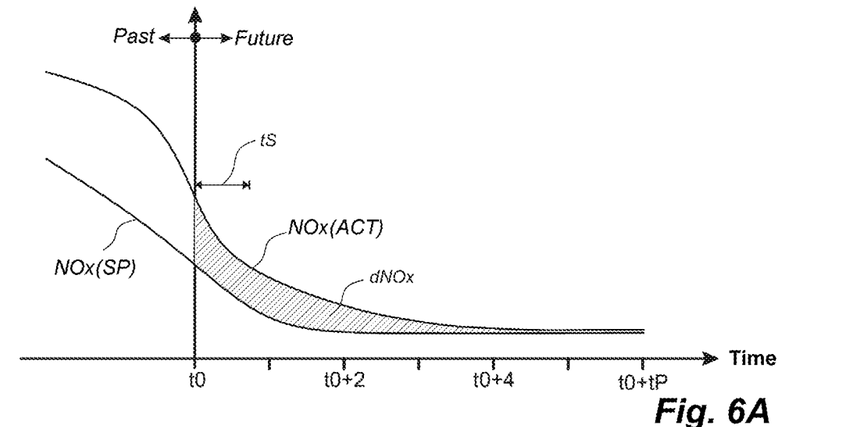
FIG. 6 shows timer-based diagrams.
Figure 6B:
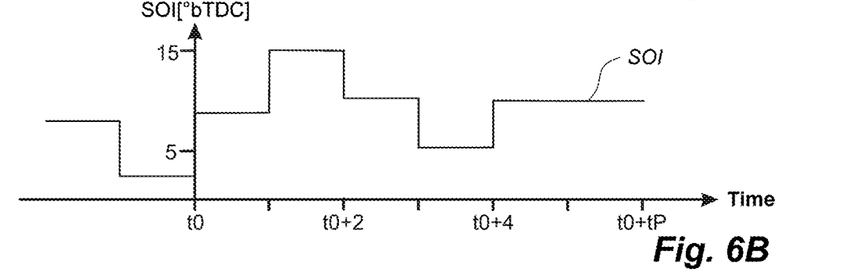
Figure 6C:
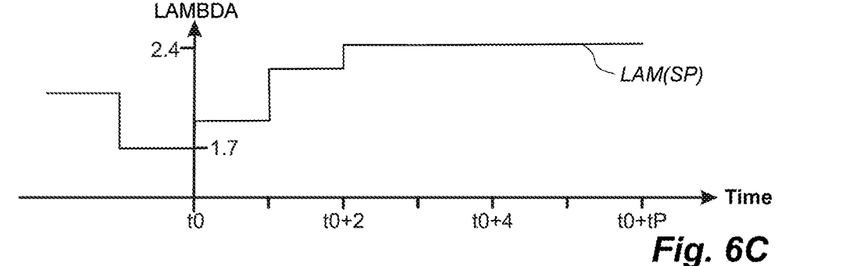
Figure 6D:
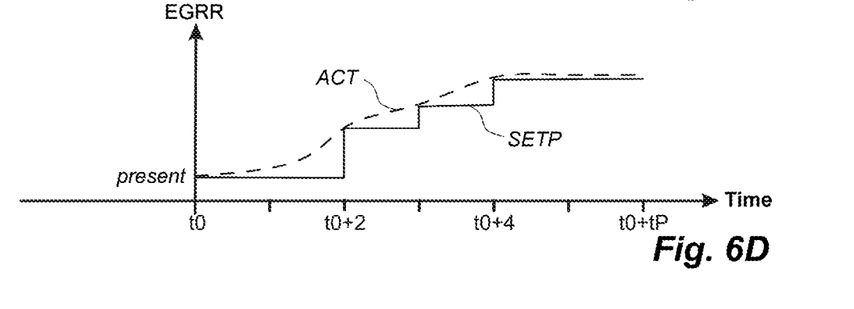

At the point in time to, the initial values of the start of injection SOI=8° and of the lambda setpoint value LAM (SP)=1.9 are set. The NOx setpoint value course NOx(SP) in FIG. 6a is predefined. Likewise at the point in time t0, the exhaust-gas recirculation is initiated for the purposes of reducing the nitrogen oxide emissions by virtue of the EGR control element (FIG. 1: 17) being moved into an opened position. In this position of the EGR control element, a present EGR rate corresponds to EGRR, see FIG. 6D. The present EGR rate EGRR at the point in time t0 is in turn a parameter of the combustion model and of the gas path model. By means of the combustion model, it is for example the case that the nitrogen oxide emission NOx, the soot fraction and the exhaust-gas temperature are calculated on the basis of the present EGR rate. The present EGR rate EGRR is the setpoint value for the subordinate gas path closed-loop controller (FIG. 2: 25, 26).

These initial values at the point in time t0 result in a setpoint-actual value deviation dNOx of corresponding magnitude, see FIG. 6A. The NOx setpoint value is calculated in a manner dependent on the measured air pressures in the air path and on the start of injection SOI. By means of the equation (1), the optimizer calculates a first quality measure J1 at the point in time t0. Subsequently, the optimizer calculates the effect that a change in the start of injection SOI and of the lambda setpoint value LAM(SP) as a function of the EGR rate within the prediction horizon (t0+tp) would have on the setpoint-actual value deviation dNOx. For this purpose, in a first step, a future value of the EGR rate EGRR is predicted from the measured variables MEAS, for example by means of the following relationship:

$$EGRR(\text{new}) = f(EGRR\text{-}ACT(t0), EGRR\text{-}SETP(t0))$$

EGRR(new): future EGR rate,
EGRR-ACT: the calculated actual EGR rate at the point in time t0 and
EGRR-SETP(t0): the EGR setpoint rate calculated by means of the gas path model at the point in time to.

The optimizer determines the second quality measure J2 at each of the points in time illustrated. By means of the subtraction of the two quality measures and the threshold value consideration, the quality measure is then minimized, that is to say it is checked whether a further optimization is promising. For the example illustrated, the optimizer determines a minimum quality measure for the point in time t0+4, which is reflected in FIG. 6A in the approximation of the NOx actual value NOx(ACT) to the NOx setpoint value NOx(SP). Corresponding to this is the course of FIG. 6D, in which a new setpoint value EGR(SP) has been output by the gas path model in each case at the points in time t0+2 to t0+4. A dashed line then illustrates the actual course of the EGR rate that takes effect.

REFERENCE DESIGNATIONS

1 Internal combustion engine
2 Fuel tank
3 Low-pressure pump
4 Intake throttle
5 High-pressure pump
6 Rail
7 Injector
8 Individual accumulator
9 Rail pressure sensor
10 Electronic control unit
11 Exhaust-gas turbocharger
12 Charge-air cooler
13 Throttle flap
14 Opening-in point
15 Inlet valve
16 Outlet valve
17 EGR control element (EGR: exhaust-gas recirculation)
18 EGR cooler
19 Turbine bypass valve
20 Combustion model
21 Gas path model
22 Optimizer
23 Estimator of EGR rate EGRR
24 Rail pressure closed control loop
25 Lambda closed control loop
26 EGR closed control loop
27 Kalman filter
28 1st function block (gas path model)
29 2nd function block (measurement equation)
30 3rd function block (correction)
31 4th function block (gas path sub-model)

The invention claimed is:

1. A method for open-loop and closed-loop control of an internal combustion engine with exhaust-gas recirculation, comprising the step of: determining an EGR rate by a Kalman filter from calculated and measured values of a gas path and from calculated and measured variables of combustion, the determining the EGR rate including using nitrogen oxide values as emissions values of the combustion.

2. The method according to claim 1, further including predicting a future EGR rate from the EGR rate, and setting the future EGR rate as definitive for a combustion model and a gas path model.

3. A method for model-based open-loop and closed-loop control of an internal combustion engine, comprising the steps of: calculating injection system setpoint values for activating injection system control elements in a manner dependent on a setpoint torque by a combustion model; and calculating gas path setpoint values for activating gas path control elements in a manner dependent on an EGR rate by a gas path model; calculating a quality measure by an optimizer in a manner dependent on the injection system setpoint values and the gas path setpoint values; minimizing the quality measure by the optimizer by varying the injection system setpoint values and the gas path setpoint values within a prediction horizon; and, setting the injection system setpoint values and the gas path setpoint values by the optimizer, based on the minimized quality measure, as being definitive for setting an operating point of the internal combustion engine, including determining the EGR rate by Kalman filtering using calculated and measured values of the gas path and using calculated and measured variables of combustion, wherein nitrogen oxide values are used as emissions values of the combustion.

4. The method according to claim 3, further including predicting a future EGR rate from the EGR rate, and setting the future EGR rate as definitive for a combustion model and a gas path model.

5. The method according to claim 3, including minimizing the quality measure by the optimizer by calculating a first quality measure at a first point in time, predicting a second quality measure within the prediction horizon at a second point in time and determining a deviation of the first and the second quality measure, and setting the second quality measure by the optimizer as a minimized quality measure when the deviation is less than a threshold value.

6. The method according to claim 3, including minimizing the quality measure by the optimizer by calculating a first quality measure at a first point in time, predicting a second quality measure within the prediction horizon at a second point in time, and setting the second quality measure by the optimizer as a minimized quality measure after performing a predefinable number of re-calculations.

7. The method according to claim 3, further including predefining a rail pressure setpoint value for a subordinate rail pressure closed control loop indirectly by the optimizer as the injection system setpoint value.

8. The method according to claim 7, including predefining a start of injection and an end of injection for activation of an injector directly by the optimizer as the injection system setpoint value.

9. The method according to claim 3, including predefining gas path setpoint values for subordinate gas path closed control loops indirectly by the optimizer.

* * * * *